United States Patent
Ichihara et al.

(10) Patent No.: US 10,703,035 B2
(45) Date of Patent: Jul. 7, 2020

(54) INJECTION MOLDING SYSTEM

(71) Applicant: FANUC Corporation, Yamanashi (JP)

(72) Inventors: Toshiaki Ichihara, Yamanashi (JP); Wataru Shiraishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 301 days.

(21) Appl. No.: 15/133,301

(22) Filed: Apr. 20, 2016

(65) Prior Publication Data
US 2016/0311146 A1   Oct. 27, 2016

(30) Foreign Application Priority Data

Apr. 27, 2015   (JP) ................... 2015-090659

(51) Int. Cl.
*B29C 45/76* (2006.01)
*B29C 45/17* (2006.01)
*B29C 45/84* (2006.01)

(52) U.S. Cl.
CPC ...... *B29C 45/1769* (2013.01); *B29C 45/7686* (2013.01); *B29C 45/84* (2013.01); *B29C 2945/7613* (2013.01); *B29C 2945/7629* (2013.01); *B29C 2945/76464* (2013.01); *B29C 2945/76943* (2013.01)

(58) Field of Classification Search
CPC . B29C 45/1769; B29C 45/7686; B29C 45/84; B29C 2945/7613; B29C 45/768; B29C 2945/7629; B29C 2945/76464; B29C 2945/76943; B28B 17/0063–0081; B28B 17/0072
See application file for complete search history.

(56) References Cited

U.S. PATENT DOCUMENTS 5,840,222 A * 11/1998 Herbst ............... B29C 37/0003
264/39
2003/0065420 A1* 4/2003 Kachnic ................. B29C 45/76
700/204
(Continued)

FOREIGN PATENT DOCUMENTS

DE 102008014958 A1 9/2009
JP 8-258093 A 10/1996
(Continued)

OTHER PUBLICATIONS

Office Action in JP Patent Application No. 2015-090659, dated Aug. 15, 2017, 13 pp.
(Continued)

*Primary Examiner* — Matthew J Daniels
*Assistant Examiner* — Andrew L Swanson
(74) *Attorney, Agent, or Firm* — Hauptman Ham, LLP

(57) ABSTRACT

In an injection molding system, a molded part transport apparatus and a worker share an area to perform cooperative work. When a molded part check mode is valid, conforming product identification inspection of a molded part is performed in an area where the worker works, and molded part sorting means sorts the molded part on the basis of a result of the inspection. As a result, the conforming product identification inspection of the molded part can be performed and the molded part can be sorted with the safety of the worker is maintained.

11 Claims, 2 Drawing Sheets

(56) References Cited

U.S. PATENT DOCUMENTS

| | | | | |
|---|---|---|---|---|
| 2003/0211188 A1* | 11/2003 | Kachnic | ................. | B29C 45/76 |
| | | | | 425/137 |
| 2005/0276877 A1 | 12/2005 | Nihei et al. | | |
| 2012/0043831 A1* | 2/2012 | Sakakibara | ............ | B25J 9/1674 |
| | | | | 307/326 |

FOREIGN PATENT DOCUMENTS

| | | | | |
|---|---|---|---|---|
| JP | 11-292034 | A | | 10/1999 |
| JP | 2002-299369 | A | | 10/2002 |
| JP | 2005-14224 | A | | 1/2005 |
| JP | 2005014224 | A | * | 1/2005 |
| JP | 2005349762 | A | | 12/2005 |
| JP | 2007-152312 | A | | 6/2007 |
| JP | 2009034755 | A | * | 2/2009 |
| JP | 2012040626 | A | | 3/2012 |
| JP | 2012-214008 | A | | 11/2012 |

OTHER PUBLICATIONS

Notice of Allowance in JP Application No. 2015-090659, dated May 15, 2018, 6pp.
Office Action in DE Application No. 102016004772.0, dated May 27, 2019, 10pp.

* cited by examiner

INJECTION MOLDING SYSTEM

RELATED APPLICATIONS

The present application claims priority to Japanese Patent Application Number 2015-090659, filed Apr. 27, 2015, the disclosure of which is hereby incorporated by reference herein in its entirety.

BACKGROUND OF THE INVENTION

Field of the Invention

The present invention relates to an injection molding system, and particularly to an injection molding system including an apparatus that acts in cooperation with a worker.

Description of the Related Art

In some cases, a molded part removal apparatus is installed along with an injection molding machine to remove a molded part and runners left in an opened mold after the molded part is molded in the injection molding machine. The molded part and runners removed by the molded part removal apparatus are then transported by the molded part removal apparatus itself, a molded part transport apparatus, or any other apparatus to a work area where a worker inspects the molded part. The molded part then undergoes good/no good evaluation on the basis of a result of the inspection and is sorted by molded part sorting means.

Japanese Patent Laid-Open No. 2005-349762 discloses a technology of a molded part removal apparatus that is mounted on an injection molding machine and removes a molded part when a mold in the molding machine is opened, and the molded part removal apparatus is so installed that an action space occupied by the molded part removal apparatus does not overlap with an operation space that a worker enters to operate an operation section of the molding machine. To this end, partitioning means for separating the action space and the operation space from each other, such as a safety fence, is provided, and a buffer area is set.

Japanese Patent Laid-Open No. 2012-40626 discloses a technology of a human cooperation robot system that allows a robot and a person to share an area for cooperation work, and when the value detected with a force sensor disposed in the robot or in a work apparatus at the front end of the robot exceeds a predetermined value, the robot is brought to a halt or the action of the robot is so controlled that the value detected with the force sensor decreases.

In the related art and the technology disclosed in Japanese Patent Laid-Open No. 2005-349762, the molded part removal apparatus itself or a transport apparatus, such as a conveyer, transports a molded part and runners to a work area where a worker works. To assure the safety of the worker in this process, it is necessary to provide a safety fence that separates the action area where the molded part removal apparatus or the transport apparatus operates from the work area where the worker works, resulting in an increase in the overall area of the injection molding system in some cases.

As for the technology disclosed in Japanese Patent Laid-Open No. 2012-40626, the document describes that a person and a robot work in a cooperative manner but disclose no specific cooperative work.

SUMMARY OF THE INVENTION

An object of the present invention is to provide an injection molding system capable of removal and inspection of a molded part with no increase in the area occupied by the injection molding system.

An injection molding system according to the present invention includes a molded part transport apparatus that transports a molded part after molding operation and molded part sorting means for sorting the molded part, and the molded part transport apparatus and a worker share an area to perform cooperative work. The molded part transport apparatus includes at least one force sensor, and when a value detected with any of the force sensor exceeds a predetermined value, action of the molded part transport apparatus is at least so controlled that the value detected with the force sensor which sensed among the force sensors decreases. The injection molding system has a molded part check mode in which the molded part is inspected. When the molded part check mode is valid, conforming product identification inspection of the molded part is performed in a molded part inspection position, and the molded part sorting means sorts the molded part on the basis of a result of the conforming product identification inspection.

Therefore, even in the injection molding system in which the molded part transport apparatus and the worker share an area, when the worker touches the molded part transport apparatus, the action of the molded part transport apparatus is so controlled that the value detected with the force sensor decrease so that the safety of the worker is maintained, whereby the worker can perform the conforming product identification inspection of the molded part and sort the molded part with the safety of the worker maintained.

When the molded part check mode is not valid, the molded part transport apparatus may transport the molded part without carrying the molded part to the molded part inspection position.

The molded part can therefore be checked only when necessary for efficient transportation of the molded part.

The conforming product identification inspection of the molded part may be performed by use of an inspection apparatus.

More accurate conforming product identification inspection can therefore be performed.

The molded part transport apparatus may be a robot.

The conforming product identification inspection may be performed on the basis of at least one of analysis of a captured image of the molded part or measurement of weight of the molded part, and whether the molded part is a conforming product or a defective product may be determined on the basis of a preset threshold.

The injection molding system may further include drive restart determination means for determining whether the molded part transport apparatus is driven in an automated manner or in a semi-automated manner on the basis of a result of the conforming product identification inspection.

Therefore, the following drive action of the molded part transport apparatus can be selected on the basis of a result of the conforming product identification inspection from the following options: automated drive action in which the injection molding machine is automatically driven; semi-automated drive action in which the injection molding machine is driven only for one cycle; or no automated drive action in which the injection molding machine is not driven in an automated manner.

The injection molding system may further include molded part transport apparatus guiding means for moving, when external force acts on a molded part gripper of the molded part transport apparatus, the molded part transport apparatus in a direction in which the external force acts.

The molded part transport apparatus may include an operation section for changing an orientation and a position of the molded part gripper.

The position and other parameters of the molded part can therefore be changed without direct touch on the molded part.

The molded part transport apparatus may include conforming product identification result input means for allowing the worker to input a result of the conforming product identification inspection.

After the worker inputs a result of the conforming product identification inspection to the conforming product identification result input means, and a predetermined period elapses, the molded part sorting means may sort the molded part on the basis of a result of the inspection.

The molded part sorting means can therefore sort the molded part in a safer manner.

The molded part transport apparatus may include action restriction means for restricting action of the molded part transport apparatus but only allowing action performed by the molded part transport apparatus guiding means and an action restriction switch that allows action performed by the action restriction means to be valid only while the worker presses the switch. The molded part transport apparatus may also serve as the molded part sorting means, and after the worker releases the action restriction switch, the molded part transport apparatus may sort the molded part on the basis of a result of the inspection.

The molded part can therefore be sorted in a safer manner.

The present invention can provide an injection molding system capable of removal and inspection of a molded part with no increase in the area occupied by the injection molding system.

BRIEF DESCRIPTION OF THE DRAWINGS

The object and features of the present invention described above and other objects and features thereof will be apparent from the following description of an example with reference to the accompanying drawings.

DETAILED DESCRIPTION OF THE PREFERRED EMBODIMENTS

Figure 1:
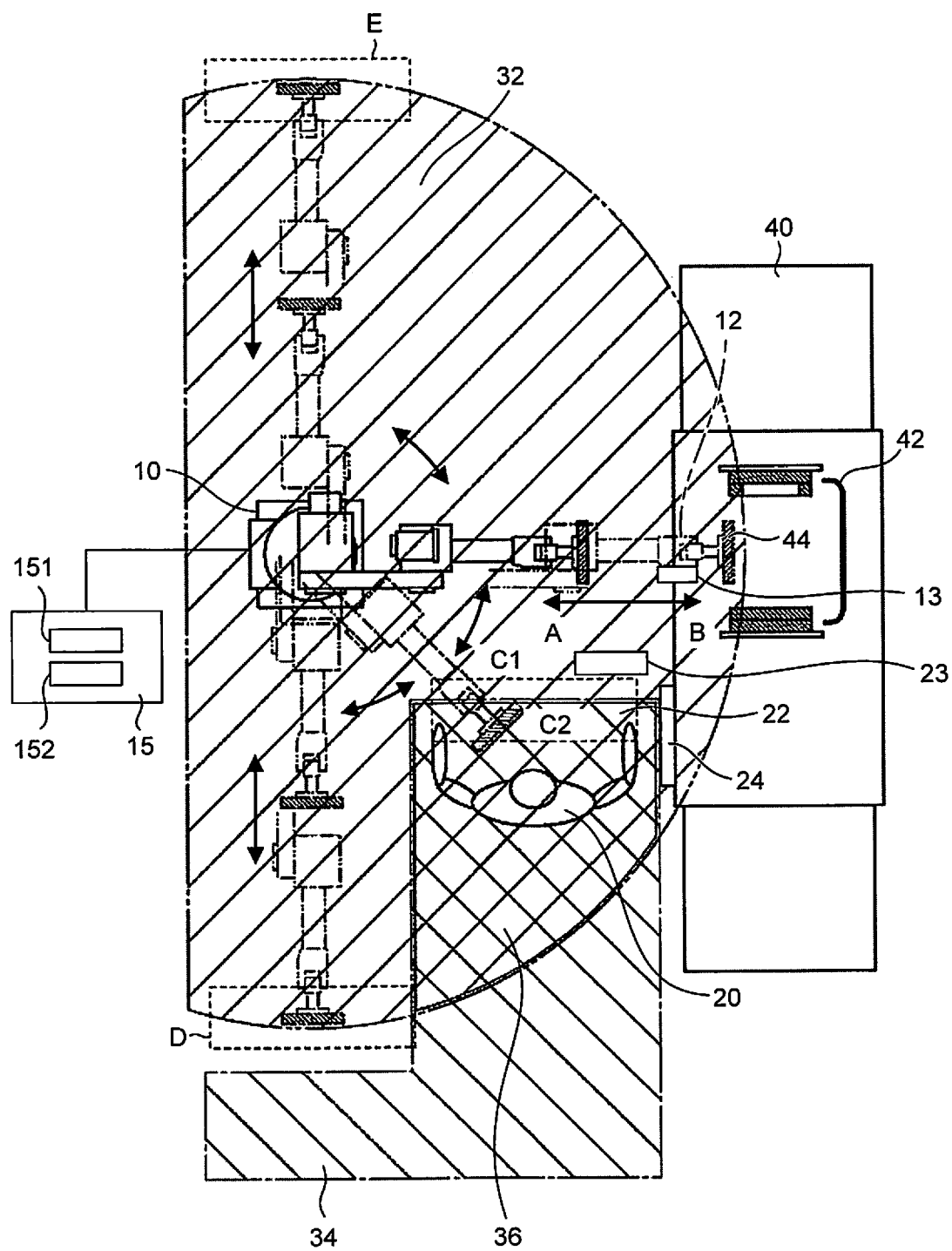
FIG. 1 shows an injection molding system according to an embodiment of the present invention.

An embodiment of the present invention will be described below with reference to the drawings. FIG. 1 shows an injection molding system according to the present embodiment, and a cooperation robot 10 is provided in the vicinity of an injection molding machine 40.

The injection molding machine 40 is configured in the same manner as a known injection molding machine of related art, and a molded part 44 is molded in molds 42 clamped to each other.

Figure 2:
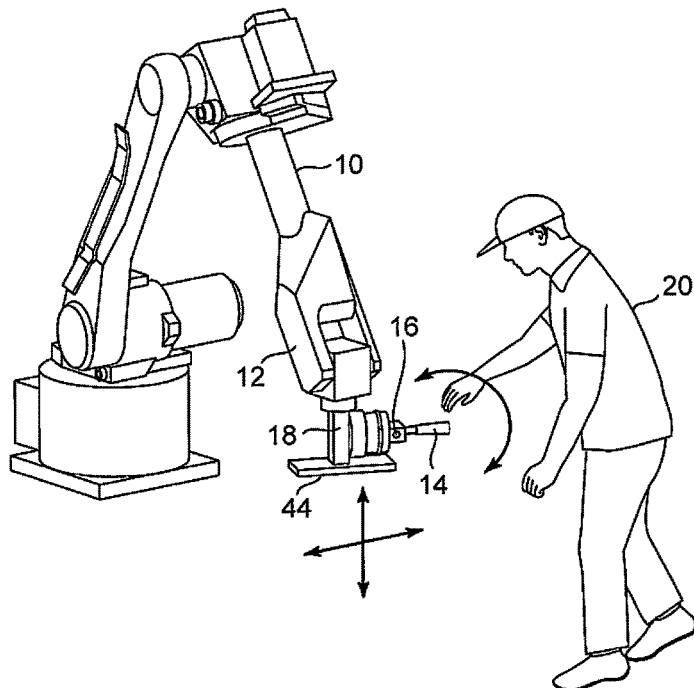
FIG. 2. shows the relationship between a cooperation robot and a worker.

In the present embodiment, the cooperation robot 10 is used to remove and transport the molded part 44 molded by the injection molding machine 40. FIG. 2 shows the relationship between the cooperation robot 10 and a worker 20. A hand 12 for removing and transporting the molded part 44 is attached to a front end portion of the cooperation robot 10. A force sensor 13 is provided in the vicinity of the hand 12 of the cooperation robot 10, and other force sensors that are not shown are attached to several portions of the cooperation robot 10, and results of detection performed by the force sensors are sent to a controller 15.

When the worker 20 comes into contact with the cooperation robot 10, and the value detected with any of the force sensors exceeds a predetermined threshold, the controller 15 brings the cooperation robot 10 to a halt or causes the cooperation robot 10 to act in such a way that the value detected with the force sensor decreases. The controller 15 thus prevents the cooperation robot 10 from exerting excessive force on the worker 20.

When the worker 20 operates an operation knob 14, by a command from a molded part transport apparatus guiding means 152, the cooperation robot 10 is moved in the direction in which the worker 20 exerts force on the operation knob 14. The operation knob 14 forms part of guide means for guiding the cooperation robot 10.

When the worker presses an action restriction switch 16, action restriction means for restricting the action of the cooperation robot 10 operates only while the action restriction switch 16 is pressed and restricts the action of the cooperation robot 10, and operation performed on the guide means, such as operation performed by the worker 20 on the operation knob 14, is only valid. Therefore, after the molded part is inspected and the worker 20 takes his/her hands off the molded part to ensure the safety of the worker, the cooperation robot 10 is allowed to sort the molded part.

Referring back to FIG. 1, the injection molding system according to the present embodiment will be described. The hand 12 of the cooperation robot 10 moves to a molded part removal location B, removes the molded part 44 after the molding operation, and then transports the molded part 44 to a molded part holding location A. When a molded part check mode is valid, the hand 12 then transports the molded part 44 to a molded part inspection position C. In the molded part inspection position C, the worker 20 or an inspection apparatus 23 inspects the molded part 44, as will be described later.

After the inspection of the molded part 44 in the molded part inspection position C (C1 or C2) is completed, the molded part 44 is sorted by molded part sorting means on the basis of a result of the inspection. When a result of the inspection shows that the molded part 44 is a conforming product, the molded part 44 is so sorted as to be placed in a conforming product stoker D, whereas when the result of the inspection shows that the molded part 44 is a defective product, the molded part 44 is so sorted as to be placed in a defective product stoker E. In this process, in a case where the transport apparatus keeps gripping the molded part 44 for inspection after the transportation, the transport apparatus itself serves as the molded part sorting means. On the other hand, when the transport apparatus releases the molded part 44 for inspection after the transportation, molded part sorting means different from the transport apparatus may be used to sort the molded part after the inspection is completed, or the transport apparatus may grip the molded part 44 again after the inspection is completed and sort the molded part 44. When molded part sorting means different from the transport apparatus is used, a conveyer may be used as the molded part sorting means, or a cooperation robot different from the transport apparatus may be used as the molded part sorting means.

When the molded part check mode is not valid but a molded part removal mode is valid, the molded part 44 after the molding operation is removed at the molded part removal location B and then transported to the molded part holding location A. The molded part 44 is then so sorted as to be placed in the conforming product stoker D. In this case, after the molded part 44 is transported to the molded part holding location A, the molded part 44 is directly so sorted as to be transported to the conforming product stoker D. Reference numeral 32 denotes an action area over which the cooperation robot pivots.

The worker 20 inspects the molded part 44 in the molded part inspection position C and issues a sorting instruction on the basis of a result of the inspection to the cooperation robot. The molded part 44 can be visually inspected by the worker 20, or the inspection can be performed with an inspection apparatus 23, such as a molded part imaging apparatus or a molded part mass measuring apparatus, installed on an inspection work bench 22. The inspection apparatus 23 may be an apparatus that captures an image of the molded part 44. In this case, a captured image or data derived from analysis of the captured image is compared with data on a conforming product for good/no good evaluation, and the molded part 44 is sorted on the basis of a result of the evaluation. A display device 24 displays a captured image, measured mass data, or any other type of information obtained when inspection apparatus 23 is used for the inspection. In a case where image analysis is performed, the good/no good evaluation can instead be made on the basis of whether or not the length or the area of a predetermined portion of a captured image exceeds a preset tolerance range. Reference numeral 34 denotes an action area where the worker 20 works.

After the good/no good evaluation is made, a drive restart determination means 151 can adjust the following action modes of the injection molding machine 40 and the cooperation robot 10 on the basis of a result of the evaluation. For example, in a case where results of the evaluation keep showing that molded parts are conforming products, the injection molding machine 40 is driven in an automated manner for a predetermined period. On the other hand, when defective products are produced but the number of them is small, the injection molding machine 40 is driven in a semi-automated manner in which it is driven in an automated manner only for one cycle after the evaluation. When defective products are produced and the number of them is large, the injection molding machine 40 may not be driven in the automated or semi-automated manner.

In the present embodiment, the action area 32, where the cooperation robot 10 acts, overlaps with the action area 34, where the worker 20 works, and the overlapping area forms a shared area 36, which is shared by the worker 20 and the cooperation robot 10, as shown in FIG. 1. When a typical robot is used, it is necessary to provide a safety fence or any other object that completely separates the action area where the worker 20 works from the action area where the robot acts to eliminate the shared area for safety assurance. In the present embodiment, in which the cooperation robot 10 is used, the safety of the worker is assured although the action areas overlap with each other. The action areas therefore do not need to be separated from each other with a safety fence or any other object.

The molded part inspection position C is set in the action area 32, where the cooperation robot acts, and the shared area 36, which is shared by the worker and the cooperation robot, is set in the action area 32, where the cooperation robot acts. The molded part inspection position C may therefore be set in the shared area 36, which is shared by the worker and the cooperation robot. Reference characters C1 and C2 in FIG. 1 each denote a case where the molded part inspection position is set in the action area 32, where the cooperation robot acts. In the two cases, the reference character C2 denotes a case where the molded part inspection position is set in the shared area 36, which is shared by the worker and the cooperation robot.

When the inspection apparatus 23 is an apparatus that captures an image of the molded part 44, the transport apparatus transports the molded part 44 to the molded part inspection position C, releases the molded part 44, and places the molded part 44 in the molded part inspection position C, and the inspection apparatus 23 captures an image of the molded part 44 for the good/no good evaluation.

Instead, the inspection apparatus 23 may capture an image of the molded part 44 with the transport apparatus keeping gripping the molded part 44 for the good/no good evaluation. In this case, the position where an image of the molded part is captured in the state in which the molded part is gripped coincides with the molded part inspection position C.

When the inspection apparatus 23 is an apparatus that measures the mass of the molded part 44, mass data produced by the measurement is compared with prestored data on the mass of a conforming product, and the good/no good evaluation is made on the basis of whether or not the measured data falls within a preset tolerance range. The molded part is then sorted on the basis of a result of the evaluation. In this case, the display device 24 can display the measured data so that the worker 20 can readily check the situation of the good/no good evaluation. Further, when the display device 24 has an input function, and a variable tolerance can be inputted to the display device 24, optimum good/no good evaluation according to the molded part 44 can be made.

When a mass measurement device is used to measure the mass of the molded part 44, the molded part 44 may be released on the mass measurement device and gripped again after the mass measurement, or the mass of the molded part 44 may be measured from force (gravity) acting on a molded part gripper of the transport apparatus in the state in which the transport apparatus grips the molded part 44. When the measurement is made with the transport apparatus gripping the molded part 44, the transport apparatus itself serves as the inspection apparatus 23, and the position where the transport apparatus measures the mass of the molded part 44 coincides with the molded part inspection position C.

The good/no good evaluation made in the inspection in the molded part inspection position C may be automated by a controller 15 of the injection molding machine, the controller of the cooperation robot 10, or a centralized management system that manages the injection molding machine and the cooperation robot 10, and a sorting instruction may be automatically outputted to the cooperation robot 10, or the worker 20 may issue a sorting instruction on the basis of inspection data or any other type of information.

The worker 20 can output a result of the good/no good evaluation to the cooperation robot 10 in the form of voice through a microphone or any other component or may output a sorting instruction to the cooperation robot 10 by pressing a button or any other component corresponding to a conforming or defective product.

When the operation knob 14 of the cooperation robot 10 shown in FIG. 2 is used, by a command from a molded part transport apparatus guiding means 152, the cooperation robot 10 transports the molded part 44 to the molded part inspection position C in the vicinity of the worker 20, and the inspection apparatus 23 is used to inspect the molded part 44 for the good/no good evaluation. In this case, operating the operation knob 14 allows adjustment of the position and orientation of the molded part 44 without direct touch on the molded part 44 to an arbitrary position where the inspection is readily performed by using a magnifying glass, a camera, or any other inspection apparatus 23.

Further, when the cooperation robot 10 is provided with an evaluation result input switch 18 that is not shown but allows input of a result of the good/no good evaluation performed by the worker 20, the worker 20 can readily input the result of the good/no good evaluation for improvement in work efficiency. Moreover, when the cooperation robot 10 is configured to act after a predetermined period elapses since the worker 20 pressed the evaluation result input switch 18, the cooperation robot 10 can act in a safer manner.

Figure 3:
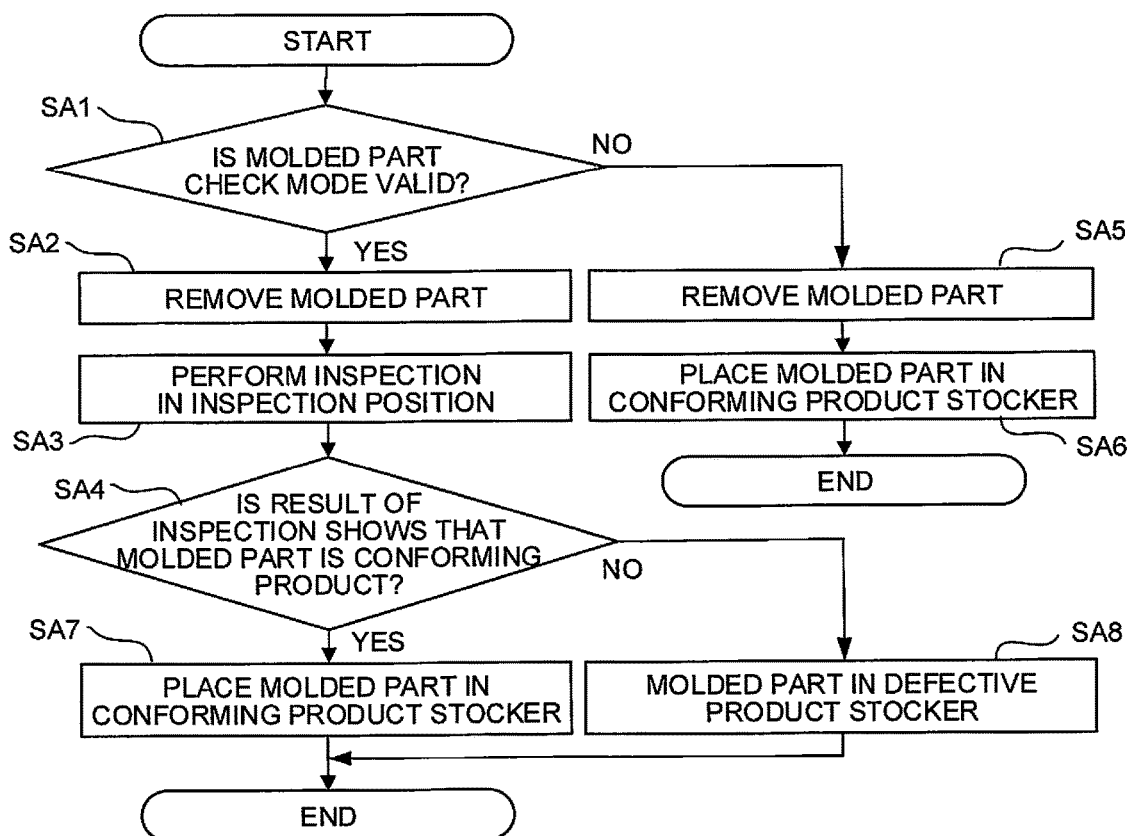
FIG. 3 is a flowchart showing actions in the embodiment of the present invention.

Actions in the present embodiment will be described on a step basis with reference to the flowchart of FIG. 3.

(Step SA1) Determine whether the molded part check mode is valid. When the molded part check mode is valid (YES), the control proceeds to step SA2, whereas when the molded part check mode is not valid but the molded part removal mode is valid (NO), the control proceeds to step SA5.

(Step SA2) Remove the molded part.

(Step SA3) Inspect the molded part in the molded part inspection position.

(Step SA4) Determine whether a result of the inspection of the molded part shows that the molded part is a conforming product. When the molded part is a conforming product (YES), the control proceeds to step SA7, whereas when the molded part is a defective product (NO), the control proceeds to step SA8.

(Step SA5) Remove the molded part.

(Step SA6) Place the molded part in the conforming product stocker.

(Step SA7) Place the molded part in the conforming product stocker.

(Step SA8) Place the molded part in the defective product stocker.

In the present embodiment, the cooperation robot 10 not only removes and transports the molded part 44 but also then sorts the molded part 44. The procedure can be replaced with a procedure in which a robot removes and transports the molded part 44 and another robot sorts the molded part 44 after it is placed in the molded part inspection position C. Still instead, a typical removal apparatus or sorting apparatus may be used in place of the robot.

The invention claimed is:

1. An injection molding system, comprising:
a molded part transport apparatus configured to transport a molded part after molding operation;
a controller configured to control the molded part transport apparatus; and
molded part sorting means for sorting the molded part, wherein
the molded part transport apparatus and a worker share an area to perform cooperative work,
the molded part transport apparatus includes a plurality of force sensors,
in response to a value detected by any sensor of the plurality of force sensors exceeding a predetermined value, the controller is configured to control action of the molded part transport apparatus to decrease the value detected by said force sensor,
the injection molding system has a molded part check mode in which the molded part is inspected,
when the molded part check mode is valid,
conforming product identification inspection of the molded part is performed in a molded part inspection position, and the molded part sorting means is configured to sort the molded part on the basis of a result of the conforming product identification inspection, and in response to the result of the conforming product identification inspection, the controller is configured to control the molded part transport apparatus to be driven in an automated manner or in a semi-automated manner, the injection molding system further comprising an injection molding machine, wherein (1) in response to results of the conforming product identification inspection showing that molded parts are conforming products, the controller is configured to control the injection molding machine and the molded part sorting means to be driven in an automated manner for a predetermined period, (2) in response to results of the conforming product identification inspection indicating that defective products are produced at a number not greater than a threshold, the controller is configured to control the injection molding machine to be driven in a semi-automated manner in which
the injection molding machine and the molded part sorting means are driven in an automated manner only for one cycle after the conforming product identification inspection, and
the molded part sorting means is driven not in the automated manner after the one cycle, and (3) in response to results of the conforming product identification inspection indicating that defective products are produced at a number greater than the threshold, the controller is configured to control the injection molding machine and the molded part sorting means to be not driven in any of the automated and semi-automated manners.

2. The injection molding system according to claim 1, wherein when the molded part check mode is not valid, the molded part transport apparatus is configured to transport the molded part without carrying the molded part to the molded part inspection position.

3. The injection molding system according to claim 1, further comprising:
an inspection apparatus configured to perform the conforming product identification inspection of the molded part.

4. The injection molding system according to claim 1, wherein the molded part transport apparatus is a robot.

5. The injection molding system according to claim 1, wherein the conforming product identification inspection is performed on the basis of at least one of analysis of a captured image of the molded part or measurement of weight of the molded part, and whether the molded part is a conforming product or a defective product is determined on the basis of a preset threshold.

6. The injection molding system according to claim 1, wherein, in response to an external force acting on a molded part gripper of the molded part transport apparatus, the controller is configured to control the molded part transport apparatus to move in a direction in which the external force acts.

7. The injection molding system according to claim 6, wherein the molded part transport apparatus includes an operation section for changing an orientation and a position of the molded part gripper.

8. The injection molding system according to claim 1, wherein the molded part transport apparatus includes conforming product identification result input means for allowing the worker to input a result of the conforming product identification inspection.

9. The injection molding system according to claim 8, wherein in response to (1) an input, by the worker, of a result of the conforming product identification inspection to the conforming product identification result input means, and (2) an elapse of a predetermined period since said input of the result of the conforming product identification inspection, the molded part sorting means is configured to sort the molded part on the basis of the result of the conforming product identification inspection.

10. The injection molding system according to claim 6, wherein the molded part transport apparatus includes
    action restriction means for restricting action of the molded part transport apparatus but only allowing the molded part transport apparatus to move in the direction in which the external force acts, and
    an action restriction switch that allows action performed by the action restriction means to be valid only while the worker presses the switch,
    the molded part transport apparatus is configured to also operate as the molded part sorting means, and
    in response to release of the action restriction switch by the worker, the molded part transport apparatus is configured to sort the molded part on the basis of the result of the conforming product identification inspection.

11. The injection molding system according to claim 1, further comprising:
    a centralized management system configured to
        manage the injection molding machine and the molded part transport apparatus, and
        evaluate whether the molded part is a conforming product or a defective product based on the result of the conforming product identification inspection.

\* \* \* \* \*